United States Patent [19]

Hayashi et al.

[11] Patent Number: 5,457,174

[45] Date of Patent: Oct. 10, 1995

[54] METHOD FOR PREPARING POLYCARBONATES BY TRANSESTERIFICATION IN A STEEL REACTOR

[75] Inventors: Katsushige Hayashi; Mitsuhiko Masumoto; Masayuki Nakajima; Takuya Hasaki; Masahiko Ishikawa; Atsushi Hirashima, all of Ibaraki, Japan

[73] Assignee: Mitsubishi Gas Chemical Company, Inc., Tokyo, Japan

[21] Appl. No.: 278,136

[22] Filed: Jul. 21, 1994

[30] Foreign Application Priority Data

Jul. 22, 1993 [JP] Japan .................................. 5-181349
Jul. 22, 1993 [JP] Japan .................................. 5-181350

[51] Int. Cl.$^6$ .................................................. C08G 64/00
[52] U.S. Cl. ........................ 528/196; 525/468; 528/198; 528/200
[58] Field of Search ........................... 525/468; 528/196, 528/198, 200

[56] References Cited

U.S. PATENT DOCUMENTS 4,383,092  5/1983  Ko et al. ................................... 526/62

FOREIGN PATENT DOCUMENTS

| 0512223 | 11/1992 | European Pat. Off. . |
| 4-72327 | 3/1992 | Japan . |
| 4-332725 | 11/1992 | Japan . |
| 5-125169 | 5/1993 | Japan . |
| 5-125168 | 5/1993 | Japan . |
| 5-125170 | 5/1993 | Japan . |
| 5-125174 | 5/1993 | Japan . |
| 5-125172 | 5/1993 | Japan . |

*Primary Examiner*—James J. Seidleck
*Assistant Examiner*—Terressa M. Mosley
*Attorney, Agent, or Firm*—Sughrue, Mion, Zinn, Macpeak & Seas

[57] ABSTRACT

A process for preparing a polycarbonate which comprises performing a transesterification and a polycondensation reaction with a diarylcarbonate and dihydroxyaryl compound, in a reaction apparatus composed of stainless steel comprising at least 12% by weight of Ni, and at least 22% by weight of Cr, and having Fe as the remaining main component. A polycarbonate which has a good color, is stable to hydrolysis and resistant to heat-yellowing is the resulting product.

12 Claims, No Drawings

METHOD FOR PREPARING POLYCARBONATES BY TRANSESTERIFICATION IN A STEEL REACTOR

FIELD OF THE INVENTION

The present invention is directed to a method for preparing polycarbonates using a transesterification process. More particularly, the present invention relates to a method for preparing polycarbonates having a good color and excellent physical properties, such as stability to hydrolysis and heat yellowing resistance, etc.

BACKGROUND OF THE INVENTION

The transesterification process in which a polycarbonate is prepared by reacting a diester carbonate with a dihydroxyaryl compound, has rather simple preparation steps, and is superior to the phosgene method with respect to operation and cost. Further, the transesterification process has recently been appreciated from an environmental aspect since phosgene and methylene chloride, which have strong toxicity, are not used.

However, the transesterification process has not been adopted in a large scale industrial process. The greatest reason for this is that the physical properties, such as color, stability to hydrolysis and heat yellowing resistance of polycarbonate, prepared by using the conventional transesterification process are inferior to the properties of polycarbonate prepared by the phosgene process. There are several reasons why these physical properties are not good. One of the reasons is the influence of the material of the reactors.

To solve the problem, for example, U.S. Pat. No. 4,383,092 describes a method for inhibiting color development in a polymer by using a special material of non-ferrous or non-stainless steel materials, such as tantalum, chrome and nickel for the material of the reactor. However, these metals are expensive, and do not easily work, so the problem with the method in U.S. Pat. No. 4,383,092 is that the reactors are very expensive to make. Further, in U.S. Pat. No. 4,383,092, there is no description of the physical properties, such as stability to hydrolysis and heat yellowing resistance, etc., of the resulting polymer.

JP-A-4-72327 (the term "JP-A" as used herein means an "unexamined published Japanese patent application") describes a method in which a metal material having a copper and/or nickel content of 85% by weight or more is used as the surface which contacts the reaction mixture. However, it has a problem that the reactors become expensive. Also, there is no description of the physical properties, such as stability to hydrolysis and heat yellowing resistance, etc., of the resulting polymer.

Further, there are descriptions of a method in which a material having a nickel and/or aluminum content of 60% by weight or more is used as the material of the reactor (JP-A-5-125168), a method in which a material having a nickel and/or molybdenum content of 60% by weight or more is used as the material of the reactor (JP-A-5-125169), a method in which a material having a nickel and/or carbon content of 60% by weight or more is used as the material of the reactor (JP-A-5-125170), a method in which a material having a nickel and/or chrome content of 60% by weight or more is used as the material of the reactor (JP-A-5-125172), a method in which a material having a copper and/or aluminum content of 60% by weight or more is used as the material of the reactor (JP-A-5-125173), a method in which a material having a copper and/or zinc content of 60% by weight or more is used as the material of the reactor (JP-A-5-125174).

Further, JP-A-4-332725 describes a method in which a material is used where the contact area with the reaction liquid in a reactor is metal plated, and a stainless steel reactor is used in which electrolytic polishing is performed on the contact area with the reaction liquid.

Although several materials are described as the material for a reactor as mentioned above, they are special materials, the reactor itself is expensive, and it is inconvenient for an industrial process. Conventionally, stainless steel reactors are understood to cause color development of the product polymer, but it is difficult to obtain a polymer having a high molecular weight and good physical properties. Further, there is no material in which both the color and the physical properties are successfully and simultaneously provided.

An object of the present invention is to provide a reactor in which a polycarbonate having excellent color, stability to hydrolysis and heat yellowing resistance can be prepared, even when a stainless steel reactor is being used.

SUMMARY OF THE INVENTION

The present inventors have conducted extensive research as to the influence and the effect of the material of the reactor and the process of preparing a polycarbonate using the transesterification process. As a result, it has now been found that in the case of stainless steel having a specified metal composition, a polycarbonate having excellent physical properties, such as color, stability to hydrolysis and heat yellowing resistance, can be prepared.

That is, the present invention provides a method for preparing a polycarbonate, which comprises carrying out a transesterification and polycondensation reaction of a diestercarbonate, such as a diarylcarbonate and dihydroxyaryl compound, in a reactor composed of stainless steel having Fe, at least 12% by weight of Ni and at least 22% by weight of Cr as a main component.

DETAILED DESCRIPTION OF THE INVENTION

Hereinafter, the present invention will be described in more detail.

The material of the reactor used in the present invention is stainless steel having Fe, from 12 to 22% by weight of Ni and from 22 to 26% by weight of Cr, and, Mn, C, Si, P, S and Mo, etc., as the other components, however they are not limited thereto. Examples of the stainless steel contained in the present invention include, SUS-309, SUS-309S (Ni content of from 12 to 15% by weight, Cr content of from 22 to 24% by weight), SUS-310, SUS-310S (Ni content of from 19 to 22% by weight, Cr content of from 24 to 26% by weight), SUS-314 (Ni content of from 19 to 22% by weight, Cr content of from 23 to 26% by weight).

Further, the present invention is directed to the part of the reactor which comes into contact with the reaction mixture, the reaction by-product and the raw material monomer, for example, the polymerizer, the fractionating column, the dissolving tank for the raw material monomer and the condenser, etc., further the connecting piping of these parts are included in this term.

Electropolishing in the present invention is a method in which material to be polished is electrolyzed as a polar electrode in an electrolyte, and selectively dissolved and polished of microscopic convex parts on the material surface.

As an electrolytic polishing liquid, an acidic electrolyte, such as phosphoric acid-sulfuric acid, phosphoric acid-sulfuric acid-chromic acid, perchloric acid-acetic acid anhydride, perchloric acid-ethyl alcohol, phosphoric acid-oxalic acid, and phosphoric acid-citric acid, etc., can be exemplified. Among these, phosphoric acid-sulfuric acid or phosphoric acid-sulfuric acid-chromic acid electrolyte are preferable. As a stabilizer, the addition of glycerine, gelatin, glue, etc., is effective.

The electrolization is carried out under the condition of from 1 to 50 V, preferably from 3 to 20 V of electric pressure, from 1 to 200 A/dm$^2$, preferably from 3 to 100 A/dm$^2$ of electrolytic density, from a temperature of 10° to 150° C., preferably from 30° to 100° C., from 1 to 30 minutes, preferably from 3 to 15 minutes of treatment time.

As a pre-treatment to the electrolytic polishing, mechanical polishing, such as buff polishing, de-greasing treatment can be carried out. As a post-treatment, after the electrolytic polishing, water-washing, acid-washing and alkali washing can be carried out.

The dihydroxyaryl compound used in the present invention is a compound having the following general formula (1):

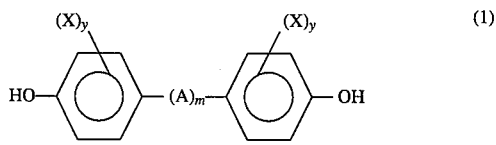

in which, A represents a divalent hydrocarbon group having from 1 to 15 carbon atoms, a divalent hydrocarbon group substituted with a halogen atom, or a divalent group, such as —S—, —S$_2$—, —SO—, —O—, and —CO—; X represents a halogen atom, an alkyl group having from 1 to 14 carbon atoms, an aryl group having from 6 to 18 carbon atoms, an oxyalkyl group having from 1 to 8 carbon atoms, and an oxyaryl group having from 6 to 18 carbon atoms. m is 0 or 1, y is an integer from 0 to 4.

The dihydroxyaryl compound represented by the above general formula (1) is, for example, 2,2-bis(4-hydroxyphenyl)propane, 2,2-bis(4-hydroxy-3,5-dimethylphenyl)propane, 2,2-bis (4-hydroxy-3,5-diethylphenyl)propane, 2,2-bis (4-hydroxy-(3,5-diphenyl)phenyl)propane, 2,2-bis (4-hydroxy-3,5 -dibromophenyl)propane, 2,2-bis(4-hydroxyphenyl)pentane, 2,4'-dihydroxydiphenylmethane,bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis( 4-hydroxyphenyl)cyclohexane, bis(4-hydroxyphenyl)sulfone, 2,4'-dihydroxydiphenyl sulfone, 5 -chloro-2,4'-dihydroxydiphenyl sulfone, bis(4-hydroxyphenyl)diphenyldisulfone, bis(4-hydroxyphenyl)sulfide, 4,4'-dihydroxydiphenylether, 4,4' -dihydroxy-3,3'-dichlorodiphenylether, 4,4'-dihydroxy-2,5-diethoxydiphenylether, etc.

These dihydroxyaryl compounds can be used independently or in combination with each other as a copolymer if necessary.

The diester carbonate used in the present invention is a compound of the following general formula (2):

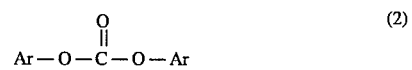

in which Ar$_1$ and Ar$_2$ each represent a monovalent aliphatic or a monovalent aryl group, and Ar$_1$ and Ar$_2$ may be the same or different.

The diester carbonate represented by formula (2) is, for example, substituted diphenyl carbonate, dimethyl carbonate, ditolyl carbonate, di-t-butyl carbonate, preferably, diphenyl carbonate, or substituted diphenyl carbonate. These diester carbonates can be used independently or in combination with each other.

In the reaction of the present invention, generally, a catalyst can be used. The catalyst used in the present invention is not limited, and can be a conventional catalyst used in a transesterification reaction. These catalysts can be used independently or in combination with each other.

These catalyst are, for example, an alkali metal compound or the salts thereof, an alkaline earth metal compound or the salts thereof, an organic basic compound, a metal alkoxide, and another organic metal compound. An alkali metal compound or the salts thereof is inexpensive and preferably used.

EXAMPLES

Hereinafter, the present invention is explained in more detail, but these examples should not be construed as limiting the scope and spirit of the invention.

The prepared polycarbonates were evaluated by the following method.

(1) Molecular Weight

Using a Ubelode viscometer, the intrinsic viscosity [η] in methylene chloride was at 20° C. measured, and calculated from the following formula:

$$[\eta]=.11\times10^{-4} (Mv)^{0.83}$$

(2) Color

From the prepared polycarbonate, an injection molding having 80 mm of diameter, ⅛ inches thick was formulated, the permeable b value was measured using a chronometer manufactured by TOKYO DENSHOKU. When the value is smaller, the color is better and the permeability is higher.

(3) Stability to Hydrolysis

The obtained polycarbonate was carried out under moisture conditioning at 800 ppm of water content in the system, heated at 300° C. for 1 hour under nitrogen flow to measure the decreasing molecular weight (ΔMv), and evaluated.

(4) Heat Yellowing Resistance

The injection molding stood under 130° C. for 20 days, and was evaluated by the changing color (Δb value).

(5) Terminal OH Amount

Colorimetry was carried out using the Titan tetrachloride/ Acetic acid method (*Makromol Chem.*, 88, 215 (1965)).

EXAMPLE 1

The main body of the reactor, the agitating element, the agitating shaft, the fractionating column are made of SUS-310S (19 to 22% by weight of Ni, from 24 to 26% by weight of Cr, less than 0.08% by weight of C, less than 1.50% by weight of Si, less than 2.00% by weight of Mn) and 110.3 g (0.515 moles) of diphenylcarbonate, 114.2 g (0.500 moles) of 2,2-bis(4-hydroxyphenyl)propane (bisphenol A) and 7.5× $10^{-7}$ moles of sodium hydroxide were charged, stood under nitrogen atmosphere at 180° C. for 0.5 hours, and then the temperature was raised to 280° C. at a speed of 25 K/hr, while vacuuming to 100 mmHg. After one hour and 15 minutes from the initiation of the heat-up the reactor was vacuumed to 50 mmHg, and subsequently, one hour later to 1 mmHg. The reaction was then carried out under agitation for a total of 6 hours.

The resulting polycarbonate had a molecular weight of 23,500, a terminal OH of 0.015% by weight, a "b" value of 0.6, which shows that the degree of coloration was very small.

Further, the stability to hydrolysis was ΔMv of −600, the heat yellowing was Δb of 0.1, which shows good physical properties.

EXAMPLE 2

A polycarbonate was prepared and evaluated using the same procedures as in Example 1, except that a reactor made of SUS-309S (from 12 to 15% by weight of Ni, from 22 to 24% by weight of Cr, less than 0.08% by weight of C, less than 1.00% by weight of Si, less than 2.00% by weight of Mn) was used.

The resulting polycarbonate had a molecular weight of 21,000, a terminal OH of 0.018% by weight, a "b" value of 0.6, which shows that the degree of coloration was very small.

Further, the stability to hydrolysis was ΔMv of −700, the heat yellowing was Δb of 0.1, which shows good physical properties.

EXAMPLE 3

A polycarbonate was prepared and evaluated using the same procedures as in Example 1, except that a reactor made of SUS-314 (from 19 to 22% by weight of Ni, from 23 to 26% by weight of Cr) was used.

The resulting polycarbonate had a molecular weight of 22,500, a terminal OH of 0.016% by weight, a "b" value of 0.6, which shows that the degree of coloration was very small.

Further, the stability to hydrolysis was ΔMv of −600, the heat yellowing was Δb of 0.1, which shows good physical properties.

COMPARATIVE EXAMPLE 1

A polycarbonate was prepared and evaluated using the same procedures as in Example 1, except that a reactor made of SUS-304 (from 8 to 10.5% by weight of Ni, from 18 to 20% by weight of Cr) was used.

The resulting polycarbonate had a molecular weight of 7,200, a terminal OH of 0.250% by weight, a "b" value of 1.8, and had a light brown color.

Further, the stability to hydrolysis was ΔMv of> −2,000, the heat yellowing was Δb of>0.5, which shows that the physical properties were not good.

COMPARATIVE EXAMPLE 2

A polycarbonate was prepared and evaluated using the same procedures as in Example 1, except that a reactor made of SUS-316L (from 10 to 14% by weight of Ni, from 16 to 18% by weight of Cr) was used.

The resulting polycarbonate had a molecular weight of 8,300, a terminal OH of 0.234% by weight, a "b" value of 1.4, and had a light brown color.

Further, the stability to hydrolysis was ΔMv of> −2,000, the heat yellowing was Δb of>0.5, which shows that the physical properties were not good.

EXAMPLE 4

Buff polishing was carried out on the surface of the contact area with the reaction liquid. The main body of the reactor, the agitating element, the agitating shaft, and the fractionating column were made of SUS-310S. The polishing surface was then washed with acetone and distilled water.

The main body of the reactor was connected to a positive electrode with an external direct power source, via a jig made of titanium, and a lead plate was connected with a negative electrode. The main body of the reactor and the lead plate (negative electrode) were dipped into an electrolyte, having a temperature of 70° C. and comprising of 75 vol % of 85% phosphoric acid and 25 vol % of 96% sulfuric acid. The electrolytic polishing was carried out under an electric pressure of 10 V, an electrolytic density of 30 A/dm$^2$, for 10 minutes with agitating the electrolyte by an agitator.

After polishing, the main body of the reactor was washed thoroughly with distilled water, dried and finished the procedures.

Using the same procedures, electrolytic polishing was carried out to the agitating element, the agitating shaft and the fractionating column.

The main body of the reactor, the agitating element, the agitating shaft, and the fractionating column are made of SUS-310S (12 to 15% by weight of Ni, from 22 to 24% by weight of Cr) and then the electrolytic polishing mentioned above was carried out on the surface thereof, 110.3 g (0.515 moles) of diphenylcarbonate, 114.2 g (0.500 moles) of 2,2-bis(4-hydroxyphenyl)propane (bisphenol A) and 7.5× $10^{-7}$ moles were charged, stood under nitrogen atmosphere at 180° C. for 0.5 hours, then raised the temperature to 280° C. at a speed of 25 K/hr, while vacuuming to 100 mmHg. When one hour and 15 minutes from the initiation of the heat-up passed, the reactor was vacuumed to 50 mmHg, and one hour later to 1 mmHg, the reaction was carried out under agitation for a total of 6 hours.

The resulting polycarbonate had a molecular weight of 28,300, a terminal OH of 0.008% by weight, a "b" value of 0.2, which shows that the degree of coloration was very small.

Further, stability to hydrolysis was ΔMv of −200, the heat yellowing was Δb of<0.1, which shows extremely good physical properties.

EXAMPLES 5–7

A polycarbonate was prepared and evaluated using the same procedures as in Example 4, except that a reactor made of SUS-310 (from 19 to 22% by weight of Ni, from 24 to 26% by weight of Cr, less than 0.25% by weight of C, less than 1.50% by weight of Si, less than 2.00% by weight of Mn), SUS-309S (from 12 to 15% by weight of Ni, from 22 to 24% by weight of Cr, less than 0.08% by weight of C, less than 1.00% by weight of Si, less than 2.00% by weight of Mn) and SUS-314 (from 19 to 22% by weight of Ni, from 23 to 26% by weight of Cr, less than 0.25% by weight of C, less than from 1.5 to 3.0% by weight of Si, less than 2.00% by weight of Mn) were used. The electrolytic polishing was carried out as above.

The results are shown in Table 1.

COMPARATIVE EXAMPLE 3

A polycarbonate was prepared and evaluated using the same procedures as in Example 4, except that a reactor made of SUS-304 (from 8 to 10.5% by weight of Ni, from 18 to 20% by weight of Cr, less than 0.08% by weight of C, less than 1.00% by weight of Si, less than 2.00% by weight of Mn) was used. The electrolytic polishing was carried out as above.

The results are shown in Table 1.

COMPARATIVE EXAMPLE 4

A polycarbonate was prepared and evaluated using the same procedures as in Example 4, except that a reactor made of SUS-316L (from 10 to 14% by weight of Ni, from 16 to 18% by weight of Cr) was used. The electrolytic polishing was carried out as above.

The results are shown in Table 1.

TABLE 1

|  | Material | Electrolytic polishing | Mv | Terminal OH | b value | Δb | ΔMv |
| --- | --- | --- | --- | --- | --- | --- | --- |
| Ex. 1 | SUS-310S | No | 23,500 | 0.015 | 0.6 | 0.1 | −600 |
| Ex. 2 | SUS-309S | No | 21,000 | 0.018 | 0.6 | 0.1 | −700 |
| Ex. 3 | SUS-314 | No | 22,500 | 0.016 | 0.6 | 0.1 | −600 |
| Ex. 4 | SUS-310S | Yes | 28,300 | 0.008 | 0.2 | <0.1 | −200 |
| Ex. 5 | SUS-310 | Yes | 28,000 | 0.008 | 0.2 | <0.1 | −200 |
| Ex. 6 | SUS-309S | Yes | 27,800 | 0.010 | 0.3 | <0.1 | −400 |
| Ex. 7 | SUS-314 | Yes | 28,000 | 0.007 | 0.3 | <0.1 | −200 |
| C. Ex. 1 | SUS-304 | No | 7,200 | 0.250 | 1.8 | >0.5 | >−2,000 |
| C. Ex. 2 | SUS-316L | No | 8,300 | 0.234 | 1.4 | >0.5 | >−2,000 |
| C. Ex. 3 | SUS-304 | Yes | 15,300 | 0.215 | 1.0 | >0.5 | −1,800 |
| C. Ex. 4 | SUS-316L | Yes | 17,700 | 0.104 | 0.9 | >0.5 | −1,600 |

Ex.: Example
C. Ex.: Comparative Example

According to the procedures of the present invention, by using materials made of stainless steel having the specified metallic composition, a polycarbonate which has a good color, and excellent physical properties can be obtained, thus this method is industrially useful.

Further, according to the present method, by using a reactor with materials made of stainless steel having the specified metallic composition, and subjecting the stainless steel to electrolytic polishing, a polycarbonate having good color, and excellent physical properties can be obtained. Thus, this method is industrially useful.

While the invention has been described in detail and with reference to specific embodiments thereof, it will be apparent to one skilled in the art that various changes and modifications can be made therein without departing from the spirit and scope thereof.

What is claimed is:

1. A process for preparing a polycarbonate comprising:

conducting a transesterification and a polycondensation reaction with a dihydroxyaryl compound represented by the following formula (1) and a diester carbonate represented by the following formula (2) in a reaction apparatus composed of stainless steel, wherein the stainless steel comprises Fe, from 12 to 22% by weight of Ni and from 22 to 26% by weight of Cr as a component;

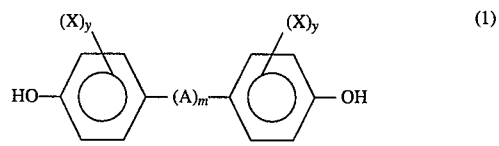

wherein A represents a divalent hydrocarbon group having from 1 to 15 carbon atoms, a divalent hydrocarbon group substituted with a halogen atom, or a divalent group selected from the group consisting of —S—, —S$_2$—, —SO—, —O— and —CO—; X represents a halogen atom, an alkyl group having from 1 to 14 carbon atoms, an aryl group having from 6 to 18 carbon atoms, an oxyalkyl group having from 1 to 8 carbon atoms, or an oxyaryl group having from 6 to 18 carbon atoms; m is 0 or 1; and y is an integer from 0 to 4;

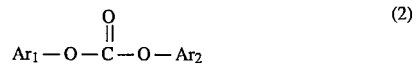

wherein $Ar_1$ and $Ar_2$ each represent a monovalent aliphatic group or a monovalent aryl group, and $Ar_1$ and $Ar_2$ may be the same or different.

2. A process for preparing a polycarbonate comprising:

conducting a transesterification and a polycondensation reaction with a dihydroxyaryl compound represented by the following formula (1) and a diester carbonate represented by the following formula (2) in a reaction apparatus composed of stainless steel, wherein the stainless steel comprises Fe, from 12 to 22% by weight of Ni and from 22 to 26% by weight of Cr as a component, and wherein the surface of the stainless steel has been polished with an electrolytic polishing liquid;

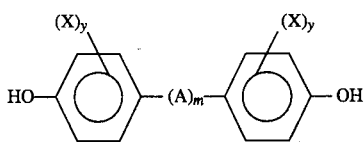

wherein A represents a divalent hydrocarbon group having from 1 to 15 carbon atoms, a divalent hydrocarbon group substituted with a halogen atom, or a divalent group selected from the group consisting of —S—, —S$_2$—, —SO—, —O— and —CO—; X represents a halogen atom, an alkyl group having from 1 to 14 carbon atoms, an aryl group having from 6 to 18 carbon atoms, an oxyalkyl group having from 1 to 8 carbon atoms, or an oxyaryl group having from 6 to 18 carbon atoms; m is 0 or 1; and y is an integer from 0 to 4;

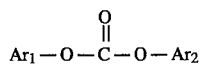

wherein Ar$_1$ and Ar$_2$ each represent a monovalent aliphatic group or a monovalent aryl group, and Ar$_1$ and Ar$_2$ may be the same or different.

3. The process for preparing a polycarbonate as claimed in claim 1, wherein the stainless steel is selected from the group consisting of:
   stainless steel comprising from 12 to 15% by weight of Ni and from 22 to 24% by weight of Cr;
   stainless steel comprising from 19 to 22% by weight of Ni and from 24 to 26% by weight of Cr; and
   stainless steel comprising from 19 to 22% by weight of Ni and from 23 to 26% by weight of Cr.

4. The process for preparing a polycarbonate as claimed in claim 1, wherein the reaction apparatus comprises a reaction vessel, a vessel for dissolving raw materials, a fractionating column, a condenser, and connecting tubes.

5. The process for preparing a polycarbonate as claimed in claim 1, wherein the diester carbonate is a diphenyl carbonate.

6. The process for preparing a polycarbonate as claimed in claim 2, wherein the diester carbonate is a diphenyl carbonate.

7. The process for preparing a polycarbonate as claimed in claim 2, wherein the stainless steel is selected from the group consisting of:
   stainless steel comprising from 12 to 15% by weight of Ni and from 22 to 24% by weight of Cr;
   stainless steel comprising from 19 to 22% by weight of Ni and from 24 to 26% by weight of Cr; and
   stainless steel comprising from 19 to 22% by weight of Ni and from 23 to 26% by weight of Cr.

8. The process for preparing a polycarbonate as claimed in claim 2, wherein the reaction apparatus comprises a reaction vessel, a vessel for dissolving raw materials, a fractionating column, a condenser, and connecting tubes.

9. The process for preparing a polycarbonate as claimed in claim 1, wherein the stainless steel further comprises at least one member selected from the group consisting of Mn, C, Si, P, S and Mo.

10. The process for preparing a polycarbonate as claimed in claim 2, wherein the stainless steel further comprises at least one member selected from the group consisting of Mn, C, Si, P, S and Mo.

11. The process for preparing a polycarbonate as claimed in claim 2, wherein the electrolytic polishing liquid comprises an acidic electrolyte which is represented by a mixture of phosphoric acid and sulfuric acid or a mixture of phosphoric acid, sulfuric acid and chromic acid.

12. The process for preparing a polycarbonate as claimed in claim 2, wherein the polishing of the surface of the stainless steel with an electrolytic polishing liquid is conducted under the conditions of an electric pressure of from 1 to 50 V, an electrolytic density of from 1 to 200 A/dm$^2$, a temperature of from 10° to 150° C., and a treatment time of from 1 to 30 minutes.

* * * * *